Jan. 12, 1932.  H. T. HERR  1,841,119
INTERNAL COMBUSTION ENGINE
Filed Feb. 21, 1930  2 Sheets-Sheet 1

INVENTOR
Herbert T. Herr.
BY
*a. B. Reavis*
ATTORNEY

Jan. 12, 1932.    H. T. HERR    1,841,119
INTERNAL COMBUSTION ENGINE
Filed Feb. 21, 1930    2 Sheets-Sheet 2
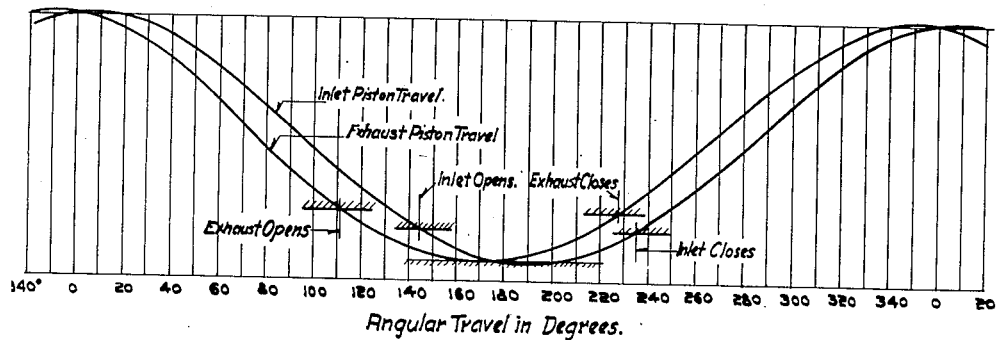
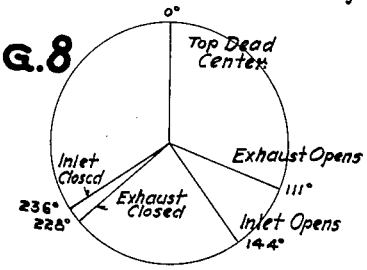
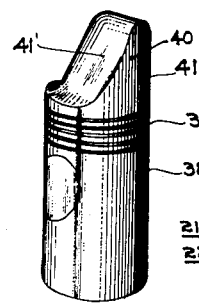
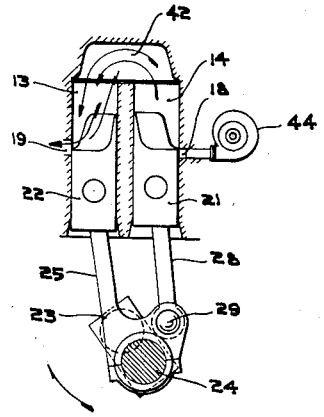
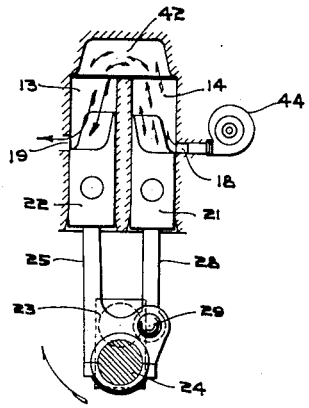
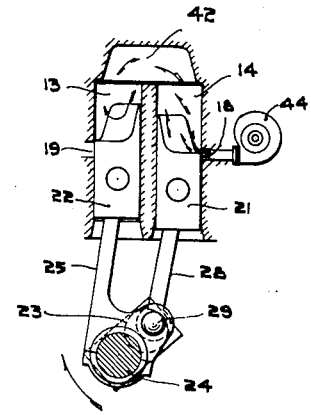
INVENTOR
Herbert T. Herr.
BY
ATTORNEY Patented Jan. 12, 1932

1,841,119

UNITED STATES PATENT OFFICE

HERBERT T. HERR, OF PHILADELPHIA, PENNSYLVANIA, ASSIGNOR TO WESTINGHOUSE ELECTRIC & MANUFACTURING COMPANY, A CORPORATION OF PENNSYLVANIA

INTERNAL COMBUSTION ENGINE

Application filed February 21, 1930. Serial No. 430,395.

My invention relates to internal combustion engines and particularly to internal combustion engines of the Diesel or compression-ignition type and still more particularly to engines of the two-cycle type and it has for an object to provide an engine of the character designated which shall operate with improved reliability and economy, which shall have a very compact cylinder arrangement and which shall be capable of developing greater power consistent with the space occupied than engines of the types heretofore provided.

It has for a further object to provide an engine of the foregoing character which shall be arranged to admit the fuel and air separately, which shall embody improved means for scavenging and supercharging the cylinders and which shall be so arranged as to utilize the working pistons to periodically close and open the intake and exhaust ports in order that the valve gear required in conventional engines may be dispensed with.

It has for still another object to provide an engine of the foregoing character which shall have its cylinders arranged in pairs, the cylinders of each pair being disposed in side-by-side relation and transversely of the crank shaft.

It has for still another object to provide an engine of the foregoing character wherein the cylinders of each pair may be disposed in free communication with each other by means of a common combustion chamber, the intake port or ports being embodied entirely in one cylinder of each pair and the exhaust port or ports in the remaining cylinder of each pair.

It has for still another object to provide an engine of the foregoing character wherein both pistons of each pair of cylinders connect to a common crank pin of a single crank shaft, the connecting rod being so arranged that the piston associated with the cylinder embodying the exhaust port leads, angularly, the piston of the cylinder embodying the intake port, whereby effective scavenging and supercharging of both cylinders may be effected.

It has for still another object to provide an engine of the foregoing character which shall embody an improved form of combustion chamber so arranged as to effect the high compression pressures required by the Diesel cycle of operation, which shall be effective to create a highly turbulent condition of the fuel-air mixture in the combustion chamber and which, in addition, shall afford free and unrestricted communication for the passage of exhaust gases as well as the scavenging and supercharging air from the cylinder embodying the intake ports to the cylinder embodying the exhaust ports.

These and other objects are effected by my invention, as will be apparent from the following description and claims, taken in connection with the accompanying drawings, forming a part of this application, in which:

Fig. 7 is a harmonic valve diagram of the engine;

Fig. 8 is a crank diagram of the engine;

Fig. 9 is a perspective view of one of the engine pistons; and,

Figs. 10, 11 and 12 are diagrammatic views showing the relative position of the pistons at different points in each cycle of revolution of the engine.

Figures 1, 2:
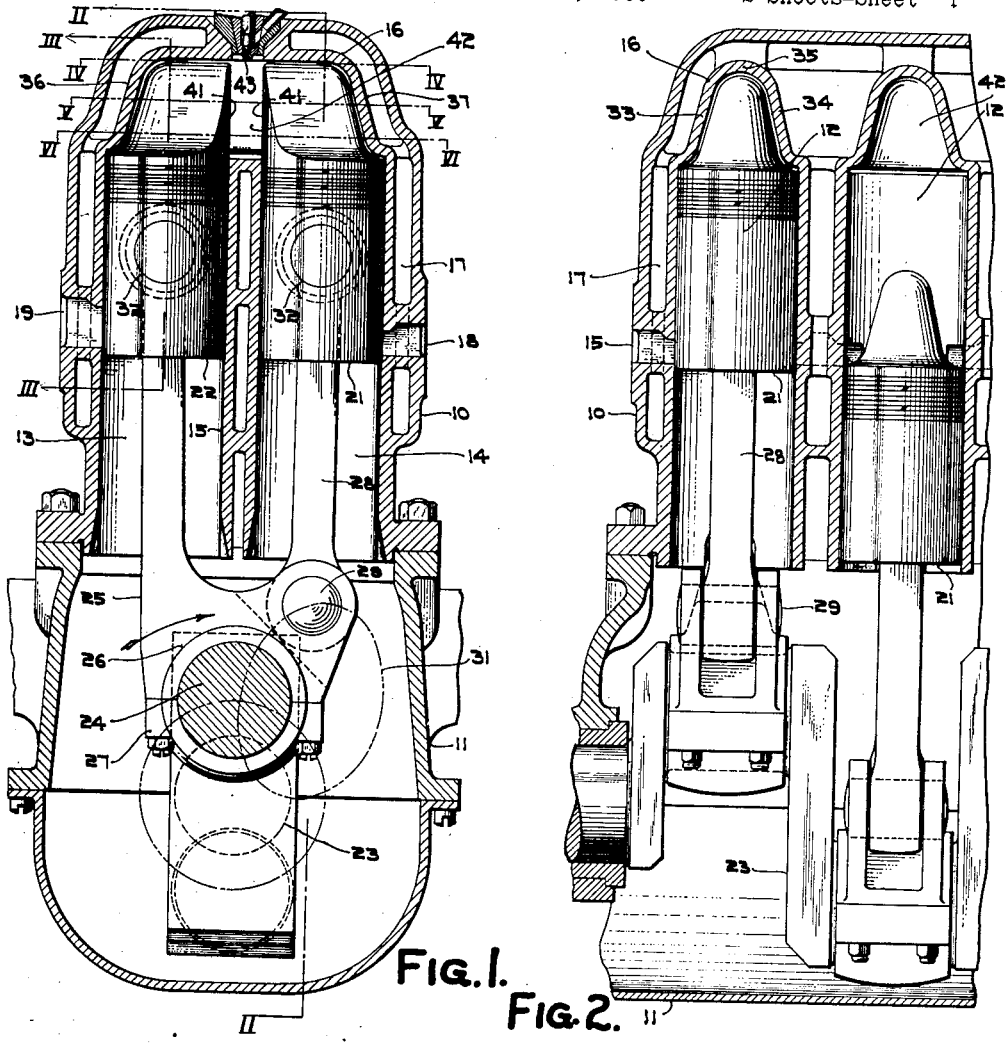
Fig. 1 is a transverse view, in sectional elevation, of one form of engine arranged in accordance with my invention.
Fig. 2 is a longitudinal, sectional view taken on the line II—II of Fig. 1.
Figure 3:
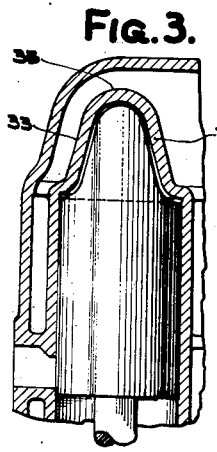
Fig. 3 is a partial, longitudinal sectional view taken on the line III—III of Fig. 1.

It is well known that the two-cycle type of engine is capable of developing, for a given piston displacement, almost twice the power of the generally employed four-cycle type of engine. However, the use of two-cycle engines operating upon the Otto cycle is relatively little compared with the four-cycle type because of the lower efficiency of the two-cycle type. The lowered efficiency results from the periodic loss of fuel mixture through the exhaust port due to the necessity of utilizing fuel mixture to scavenge and supercharge the cylinders. This economy limitations is not present in engines of the two-cycle type which operate upon the Diesel principle inasmuch as, in engines of this type, the fuel may be admitted separately to the cylinders and at a different time from the scavenging and supercharging air.

The most desirable type of two-cycle Diesel engine is the opposed piston type wherein the fuel is admitted at a central portion of the cylinder, the intake ports are located in one end portion of the cylinder and the exhaust ports in the opposite end portion of the cylinder. With an engine of this character, one piston may be utilized to cover and uncover the intake ports and the other piston to cover and uncover the exhaust ports, thus entirely dispensing with the requirement of complicated valve gear mechanism. Such engines may be thoroughly scavenged and supercharged inasmuch as the air flows longitudinally through the cylinder from the intake port at one end of the cylinder to the exhaust port at the other end of the cylinder. By having the exhaust port controlling piston lead, angularly, the intake port controlling piston, a very effective supercharging effect is obtained, and, the fuel being admitted at the central portion of the cylinder at a time when the exhaust port is covered by its associated piston, no fuel can escape through the exhaust port. Hence, engines of the opposed piston, Diesel type, operate with very high efficiency upon the two-cycle principle.

Because of the length of the cylinders, engines of the opposed piston type are not adapted for such automotive work as the propulsion of trucks, busses, motor boats, etc., because of the space limitations imposed. I have, therefore, conceived of a form of engine which embodies all of the advantages of the opposed piston type of Diesel engine and which is applicable to installations where an engine of the opposed piston type is not.

In accordance with my invention, I provide an engine which is composed of pairs of cylinders, the cylinders of each pair being disposed in side-by-side relation and extending in a direction transversely of the crank shaft. The cylinders of each pair communicate with each other through a common combustion chamber. The intake ports are all embodied in one cylinder of each pair and the exhaust ports in the remaining cylinder, the piston in the first cylinder being arranged to cover and uncover the intake ports and the piston in the remaining cylinder being arranged to cover and uncover the exhaust ports. The pistons of each pair of cylinders are preferably connected to a common crank pin of the crank shaft, the connecting rod being so formed that the exhaust port controlling piston leads, angularly, the intake port controlling piston. In this way, all valve gears are dispensed with and the scavenging fluid sweeps through the cylinder containing the intake ports, and thence passes by way of the combustion chamber into the cylinder containing the exhaust ports. As the exhaust ports are closed before the intake ports, the scavenging fluid serves to supercharge both cylinders.

As stated heretofore, it is highly desirable that the fuel be admitted to the cylinder separately from the scavenging and supercharging fluid and, hence, my improved engine operates upon the Diesel cycle. In engines operating upon the Diesel cycle, a very high compression pressure is required in order to effect ignition. For example, a compression ratio of 16 to 1 may be required. I have, therefore, embodied in my engine an improved type of combustion chamber which is capable of producing, in an engine of the character proposed, the required compression pressure and at the same time, affording free and unrestricted circulation of the scavenging and supercharging fluid from the cylinder having the intake ports, to the cylinder having the exhaust ports. Furthermore, in order to obtain good combustion efficiency, I have so formed my combustion chamber as to produce a very high degree of turbulence therein. For a detailed description of the construction of my improved form of engine and of the combustion chamber portion thereof, reference will now be made to the accompanying drawings.

Referring to Figs. 1 and 2, I show an engine having a cylinder block 10 to which suitable crank case 11 is connected. The cylinder block 10 embodies one or more pair 12 of cylinders 13 and 14 disposed in longitudinal or axial alignment, the cylinders 13 and 14 of each pair being disposed in side-by-side relation and being preferably arranged in common plane extending transversely of the engine axis. A central division wall 15 extends between the cylinders 13 and 14 of each pair. It is obvious that the engine may be composed of any required number of pair of cylinders to meet the power requirement imposed. The cylinders 13 and 14 of each pair are preferably of equal bore and have a common cylinder head 16. In the present embodiment, I show a cylinder head 1 formed as a part of the cylinder block, but it will be obvious that, if desired, the cylinder head may be so formed as to be readily detachable from the cylinder block. Suitable cooling jacket spaces 17 are embodied in the cylinder block, which jacket spaces exten about the circular walls of the cylinders as well as about the cylinder head.

Located in the cylinder 14 of each pair are intake ports 18 which preferably extend circumferentially about the cylinder, while located in the cylinder 13 of each pair are exhaust ports 19 which also extend circumferentially about the cylinder. Disposed within the cylinders, respectively, are pistons 21 and 22, the piston 21 being arranged to cover and uncover the inlet ports 18 and the piston 22 being arranged to cover and uncover the exhaust ports 19. Preferably, the exhaust ports 19 are longer than the inlet ports 18 in order to facilitate liberation of the burnt gases.

Extending longitudinally through the crank case 11 is a suitable crank shaft 23 having the required number of crank pins 24. The arrangement is preferably such that the pistons of both cylinders of each pair connect to a common crank pin. In order to effect such a connection, I provide, for the piston 22, a master connecting rod 25 provided with a crank pin bearing 26 journaled upon the crank pin 24. A detachable bearing cap 27 is embodied in the bearing 26. The piston 21 is provided with a secondary piston rod 28 which is articulately connected to the master rod 25, as by a pin at 29. By connecting the secondary piston connecting rod to the master rod 25 as shown, the exhaust port controlling piston 22 is made to lead, angularly, the inlet port controlling piston 21 when the engine is rotating in the direction indicated by the arrow. The advantages of providing such a lead feature will be apparent from the subsequent description.

The locus of travel of the pin 29 is graphically indicated by the ellipse 31. Preferably, the master connecting rod 25 and the secondary connecting rod 28 are so arranged that their axes remain substantially parallel with respect to each other throughout the complete cycle of revolution and their axes are also preferably so arranged as to be spaced approximately equal distances from the axis of the crank pin in order that the moments of the forces imposed upon the crank pin may be balanced against each other. Such an arrangement provides a more rugged form of connecting rod structure of the character illustrated and at the same time tends to provide a smoother running engine. The respective rods 25 and 28 are connected to their associated pistons by means of suitable wrist pins 32 arranged in a manner well understood in the art.

The cylinder head 16 of each pair of cylinders preferably has converging boundary walls, thereby materially reducing the displacement of the cylinder head. A preferred form of construction is illustrated in the drawings wherein the side walls 33 and 34 of each combustion chamber converge toward each other and are joined in a central, circular apex 35. The side walls 33 and 34 are joined at their ends by semi-cylindrical end walls 36 and 37 which also converge toward each other. The form of the cylinder head will be especially apparent from Figs. 4 to 6 from which it is evident that the transverse area of the cylinder head is relatively small near the top and increases in area in the direction of the cylinders.

Figure 4:
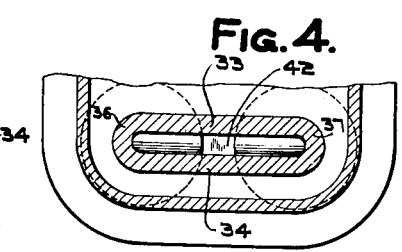
Figs. 4, 5 and 6 are plan views, in sections, taken on the lines IV—IV, V—V and VI—VI of Fig. 1, respectively.
Figure 5:
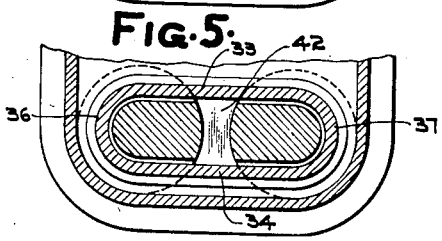
Figure 6:
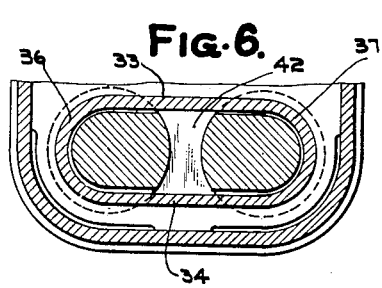

The pistons 21 and 22 are preferably of identical form and, as shown in Fig. 9, embody a skirt portion 38, a ring belt portion 39 and a head portion 40. Each of the head portions 40 are truncated on their outermost sides in order to conform with the contour of the adjacent surfaces of the cylinder head. The inner and adjacent sides 41 of the pistons are preferably a surface of revolution continued from the skirt and ring belt portions of the piston. Hence, when the pistons are in their uppermost positions, such as illustrated in Fig. 1, they define an intervening high compression space 42 having, as shown in Figs. 4, 5 and 6, opposed converging-diverging end walls and, as shown in the right hand cylinder of Fig. 2, side and bottom walls disposed in triangular formation.

In accordance with my invention, I so form the pistons that their truncated portions 41' conform with the inner contour of the adjacent surfaces of the combustion chamber so that, when the pistons are at the ends of their compression strokes, that is, the positions illustrated in Fig. 1, a minimum amount of clearance intervenes between the pistons and the cylinder head. As will be further apparent from the right hand cylinder shown in Fig. 2, the cylinder head is so arranged that, when the pistons are in a lowered position, the chamber 42 provides a free and uninterrupted opening for the passage of gaseous media through the cylinder head from the cylinder 14 to the cylinder 13. As my engine operates upon the Diesel cycle, a suitable fuel injection nozzle 43 is arranged to discharge fuel into the high compression chamber 42.

From the foregoing description, the operation of my engine will be apparent. Assuming that the engine is operating and that a power stroke has just taken place, both pistons 21 and 22 move downwardly until the exhaust port 19 is uncovered by the piston 22. As shown particularly in Fig. 10, the exhaust port controlling piston 22 leads, angularly, the inlet port controlling piston 21 so that the exhaust port 19 is uncovered while the inlet port 18 remains covered. At such times, the exhaust gases from both cylinders are liberated through the exhaust port 19, the gases from the cylinder 14 passing freely through the high compression space or passageway 42 of the cylinder head. As the pistons continue to move downwardly, they reach the position shown in Fig. 11 from which it will be apparent that the inlet port 18 has now been uncovered by the piston 21 and a suitable scavenging fluid, such as air, is supplied by any suitable means, such as a blower 44, through the inlet port 18. This air sweeps through the cylinder 14 and thence into the cylinder 13 by way of the passageway 42 and scavenges both cylinders of the burnt gases, through the outlet port 19. This scavenging process continues until such time as the pistons start upwardly upon their return strokes, whereupon, as shown in Fig. 12, the exhaust port 19 is first covered by the piston 22, the inlet port 18 remaining open. As a result, the blower 44 continues to supply air to both the cylinders 13 and 14 and, since the exhaust port 19 is closed at such times, both cylinders are effectively supercharged. The pistons then continue to move upwardly toward the cylinder head, the inlet port 18 is closed and compression of the air in both cylinders as well as in the cylinder head is effected.

As pointed out heretofore, the pistons make a very close clearance with the cylinder head so that substantially all of the compressed air is segregated in the high pressure space 42. As the pistons approach the ends of their compression strokes, liquid fuel at the required pressure is admitted through the injection nozzle 43 and ignition is effected in accordance with the well known principles of the Diesel cycle. As is well understood in the art, fuel injection continues for a time after the pistons start moving downwardly upon their power or working strokes at the ends of which they again reach the positions shown in Fig. 10, whereupon the cycle of operation is repeated.

From the foregoing, it will be apparent that I have provided a form of connecting rod structure which provides for the exhaust port controlling piston leading, angularly, the inlet port controlling piston. This will be apparent from the harmonic valve diagram shown in Fig. 7 as well as from the crank diagram shown in Fig. 8. As arranged in the present embodiment, the exhaust port is uncovered by the exhaust port controlling piston when the crank shaft has moved 111 degrees past top dead center while the inlet port controlling piston is not opened before the crank shaft reaches 144 degrees past dead center. Hence, during each revolution of the crank shaft (the engine operating upon the two-cycle principle), the exhaust of the gaseous media from both cylinders takes place during 33 degrees of the crank angle. From a position 144 degrees past top dead center until a position 228 degrees past top dead center is reached, the scavenging process takes place during which time the blower 44 circulates air through both cylinders as well as their common cylinder head. When the crank shaft reaches a position 228 degrees past top dead center, the exhaust port is closed. However, the inlet port remains open until the crank shaft reaches a position 236 degrees past top dead center, thereby providing for supercharging of both cylinders and the cylinder head during 8 degrees of the crank angle. Thereafter, until the top dead center position is again reached, compression takes place.

It will thus be seen that I have provided a form of engine which operates upon the two-cycle principle and wherein the pistons cover and uncover the inlet and exhaust ports, no mechanical or extraneous valve gear being required. It will be further apparent that the fuel is admitted separately from the air and that, at times when the fuel is being admitted, the exhaust port is closed so that no fuel escapes with the exhaust gases. Hence, good economy is assured. While the present connecting rod mechanism is arranged for clockwise direction of rotation of the engine, it is apparent that the connecting rod mechanism may readily be assembled in the reverse position should it be desired to construct an engine operating in a direction opposite to that illustrated, the intake and exhaust ports being, of course, interchanged.

As required by the Diesel cycle of operation, a very high compression ratio is desirable. For example, I find that a compression ratio of 16 to 1 affords very good results with an engine of the character illustrated. I have therefore provided a form of cylinder head as well as an arrangement of pistons which is capable of effecting such a high compression ratio in that the pistons and the cylinder head are so formed that the major portion of the compressed air is segregated in the intervening high compression space 42, into which space the fuel is solidly injected in timed relation with the rotation of the crank shaft. Such a form of combustion chamber makes it possible to operate an engine of the character illustrated in accordance with the Diesel principle. Furthermore, it provides for good combustion efficiency in that the forcing of the air into the intermediate high compression chamber creates a very high degree of turbulence and, hence, the air and the fuel are thoroughly commingled. In addition, the combustion chamber is so formed that, when the pistons are in their lower positions, a free and uninterrupted passage for the gaseous media from the cylinder 14 to the cylinder 13 is afforded, the combustion chamber creating slight resistance to the free passage of the gases.

It will therefore be apparent that I have devised a form of engine which is extremely compact, dispenses with the requirement for the conventional valve gear and ignition system, operates efficiently upon the two-cycle principle and utilizes relatively cheap fuel as motive fluid. Such a form of engine undoubtedly has a very wide field of application.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In a two-cycle Diesel engine, the combination of a cylinder structure embodying first and second cylinders disposed in side-by-side relation and a common cylinder head affording communication between the cylinders, an intake port provided in the side wall of the first cylinder and an exhaust port provided in the side wall of the second cylinder, a piston in each of the cylinders and arranged to cover and uncover, respectively, the inlet and exhaust ports, a crank shaft, means for operatively connecting both pistons to said crank shaft and providing for the exhaust port controlling piston leading the intake port controlling piston, whereby scavenging and supercharging of both cylinders is effected, said head structure having semi-frusto-conical end walls substantially coaxial with the respective cylinders and joined by side walls which converge toward each other and are joined at their apex and each of said pistons having head portions the adjacent surfaces of which conform with the bore of the cylinders and define, when the pistons are near the ends of their compression strokes, an intervening high compression space, and the remaining portions of said piston head portions being truncated so as to define close clearances with the end walls of the combustion chamber, and means for injecting liquid fuel into said intervening high compression space.

2. In a two-cycle Diesel engine, the combination of a cylinder structure embodying first and second cylinders disposed in side-by-side relation and a common cylinder head affording communication between the cylinders, an intake port provided in the side wall of the first cylinder and an exhaust port provided in the side wall of the second cylinder, a piston in each of the cylinders and arranged to cover and uncover, respectively, the inlet and exhaust ports, a crank shaft, means for operatively connecting both pistons to said crank shaft and providing for the exhaust port controlling piston leading the intake port controlling piston, whereby scavenging and supercharging of both cylinders is effected, said cylinder head having its side walls inclined toward each other and joined at their apex and said pistons having their adjacent wall portions conforming with the bore of the cylinders and forming, when near the ends of their compression strokes, a high compression chamber formed of two oppositely disposed converging-diverging end walls and side walls joined in substantially triangular formation, and means for periodically injecting liquid fuel into said chamber.

In testimony whereof, I have hereunto subscribed my name this fourth day of February, 1930.

HERBERT T. HERR.